(12) United States Patent
Polzin et al.

(10) Patent No.: US 9,663,683 B2
(45) Date of Patent: May 30, 2017

(54) POLISH COMPOSITION

(75) Inventors: Thomas E. Polzin, Sturtevant, WI (US); Rahul Saxena, Racine, WI (US); Lynn M. Werkowski, Oak Creek, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 1 day.

(21) Appl. No.: 13/285,827

(22) Filed: Oct. 31, 2011

(65) Prior Publication Data

US 2013/0109794 A1    May 2, 2013

(51) Int. Cl.
*C09G 1/04* (2006.01)
*C09G 1/16* (2006.01)

(52) U.S. Cl.
CPC ........ *C09G 1/04* (2013.01); *C09G 1/16* (2013.01)

(58) Field of Classification Search
None
See application file for complete search history.

(56) References Cited

U.S. PATENT DOCUMENTS

| | | | |
|---|---|---|---|
| 5,393,454 A | 2/1995 | Mondin et al. | |
| 5,681,377 A * | 10/1997 | Lohr et al. | 106/3 |
| 5,916,967 A | 6/1999 | Jones et al. | |
| 6,013,323 A | 1/2000 | Klayder et al. | |
| 6,090,767 A | 7/2000 | Jackson et al. | |
| 6,352,582 B1 * | 3/2002 | Brown | 106/3 |
| 7,001,463 B2 | 2/2006 | Jones | |
| 7,318,871 B2 | 1/2008 | Egan et al. | |
| 7,378,382 B2 | 5/2008 | Serobian et al. | |
| 7,381,249 B2 * | 6/2008 | Hasinovic et al. | 106/10 |
| 7,399,738 B1 | 7/2008 | Serobian | |
| 7,541,323 B2 | 6/2009 | Serobian | |
| 2006/0193789 A1 | 8/2006 | Tamarkin et al. | |
| 2007/0253926 A1 * | 11/2007 | Tadrowski et al. | 424/70.13 |
| 2007/0275867 A1 | 11/2007 | Serobian | |
| 2009/0035451 A1 | 2/2009 | Serobian | |
| 2012/0097070 A1 * | 4/2012 | Serobian | C09G 1/16 106/287.1 |

FOREIGN PATENT DOCUMENTS

EP    868491 B1 *    3/2000

OTHER PUBLICATIONS

Lubrizol, Introducing Pemulen Polymeric Emulsifiers, 2002.*
PCT/US2012/061887 International Search Report dated Feb. 20, 2013.
Clariant, "Process aids for the Chemical Industry. Surfactants", Jan. 1, 2009, XP055053266.

* cited by examiner

*Primary Examiner* — Liam J Heincer

(57) ABSTRACT

An optionally VOC-free silicone containing furniture polish is prepared using one or both of 1) a low viscosity silicone fluid and 2) a polydiorganosiloxane; and 3) a phosphonic acid dispersant together with water and one or more suitable surfactants.

8 Claims, No Drawings

POLISH COMPOSITION

TECHNICAL FIELD

The present disclosure is directed to improved and optionally VOC-free furniture polish compositions in the form of liquids, aerosols, creams and lotions. These compositions contain a silicone component including one or both of a low viscosity silicone fluid with a viscosity of about 5-5,000 centistokes, and polydiorganosiloxanes. The polish compositions also include a phosphonic acid dispersing agent, surfactants and reduced levels of volatile organic components. Conventional furniture polish ingredients such as solvents, water, emulsifiers, fragrance, colors and preservatives may also be included.

BACKGROUND ART

Most furniture has a lacquer coating or "film" on certain portions of its external surfaces. Those skilled in the art know that conventional furniture polishes form at least one additional fill layer on top of the furniture lacquer coating or fill. "Smearing" of a polished furniture surface occurs when a shearing force is applied to an area or region along the surface of the furniture polish film layer.

"Smears" can be caused by such factors as the diffusion of reflected light rays, the exposure of the underlying substrate surface, and so forth.

The ability of a polished furniture surface (i.e., the furniture polish fill layer) to return to its original appearance after being smeared, and the amount of time required to return the furniture polish fill layer to its original appearance, are two factors which tend to be important in evaluating the performance of any furniture polish composition or formulation.

Furniture polish compositions or formulations possessing superior smear recovery properties have long been desired. Commercially-available silicone-containing furniture polishes, however, and in particular the surface-applied films they produce, typically lack this particular quality. Indeed, many conventional dimethyl silicones tend to deposit films which exhibit "bronzing" i.e., a tendency to streak. Moreover, many dimethyl silicones, which are commonly found in furniture polishes, are liquid and naturally tend to smear.

To reduce "bronzing", formulators of a number of presently commercially-available furniture polishes incorporate certain additives—such as waxes, oils and/or surfactants—into many of their dimethyl silicone-containing furniture polish formulations. The addition of such additives to a furniture polish formulation, however, often produces undesirable effects. For example, the addition of wax to such a polish formulation generally reduces the ability of the resultant polish film to exhibit total smear recovery; while the addition of oil and/or surfactant tends to make a smear more visible, which is generally undesirable.

Thus, commercial furniture polishes that use conventional silicone-containing or conventional silicone-based fluids, as well as certain conventional waxes, surfactants and/or certain oils, seemingly initially tend to provide certain desirable surface-appearance values but, in fact, ultimately suffer from a variety of inherent disadvantages.

Efforts have been made to overcome these known disadvantages of prior art silicone containing furniture polishes. An example of such a composition is found in Miller, U.S. Pat. No. 5,112,394 which discloses a furniture polish concentrate containing dimethyl silicone and a poly(dimethyl)-copoly(methyl, oxygen containing) siloxane copolymer.

Furniture polish compositions based on silicone oils also suffer from a phenomenon known as "mottling". Silicone oils tend to migrate into lower areas on the wood surface, such as imperfections (scratches, chips, etc.). This migration creates dull spots in the polished surface, or mottling. To prevent this migration, wax is added to anchor the silicone molecules to the surface. Ratios of emulsified wax:silicone oil as high as 1:1 have been used to anchor the silicone. However, the emulsified wax contains solid discrete particles which decrease the clarity of the resulting film or finish, and the hardness of the wax particles increases the amount of time and effort to buff the film to a shine.

Additionally, wax-containing formulations are more costly to produce because the wax must be heated to ensure it is adequately incorporated into the furniture polish composition.

Another feature of furniture polish that is important to consumers is ease of application, or spreadability. Polishes which are difficult or time consuming to apply uniformly are not desirable. Polishes including wax and/or in which the components of the polish are not adequately solubilized can suffer from this phenomenon.

Furniture polish is also expected to provide a shine to the treated surface. Polish compositions providing high shine or high gloss are viewed favorably by the consumer. Those compositions which can maintain the shine or gloss over time are most preferred.

Conventional silicone containing furniture compositions often create an undesirable greasy or oily-feeling surface.

In addition, prior art furniture compositions include amounts of volatile organic components (VOCs), most often in the form of organic solvents, that can be harmful to the environment and/or to those individuals who are utilizing the compositions. In recent years, there has been a desire to limit the amount of VOCs dispensed into the atmosphere in order to limit the detrimental effects of these VOCs on the atmosphere or environment. Further, while these organic solvents assist furniture polish compositions in making them easy to apply to a surface, they often require wiping a surface repeatedly to remove dust and buff to a shine. Additionally these organic solvent based furniture polishes leave behind residue or a greasy film on a surface treated with the polish. As such, there remains a need to provide a furniture polish composition which removes dust, is easy to spread and buff to a shine with minimal residue.

To achieve the goals desired by consumers and to overcome the disadvantages of the prior art, we have discovered furniture polish compositions which provide long-lasting, high gloss; are resistant to smears and heal smears quickly; and are resistant to mottling and are easy to apply. These compositions also provide a cleaner feeling surface. These compositions have improved solubilization of the components of the polish composition. Additionally, these compositions have reduced amounts of VOCs in the compositions to consequently reduce the detrimental effects of the compositions on the atmosphere.

Therefore, according to one aspect of this disclosure a silicone-based furniture polish composition is provided that better solubilizes the components of the polish composition with little or no heat required to be added to the composition during its formation, reducing the cost of manufacture.

According to another aspect of this disclosure a furniture polish composition is provided that is resistant to smears and heals smears rapidly.

According to yet another aspect of this disclosure an easy-to-use furniture polish is provided which results in a high gloss, long-lasting shine and a cleaner feeling surface.

According to still another aspect of this disclosure a furniture polish composition is provided that has greatly reduced amounts of VOCs in the composition.

SUMMARY DISCLOSURE OF INVENTION

We have discovered furniture polish compositions with improved smear resistance and recovery, high gloss, long-lasting shine, easy application, better solubilization of the components of the polish composition with little or no heat applied to the composition during its formation, clean feeling surface and resistance to mottling, along with limited environmental effects. These compositions are related to those found in Lohr U.S. Pat. No. 5,681,377, which incorporated herein by reference in its entirety, and comprise a silicone component formed of one or both of 1) a silicone fluid and 2) a polydiorganosiloxane which may be terminated with hydroxyl, methyl, alkoxy or vinyl groups; and a phosphonic acid dispersing component, with the balance being water. The composition also optionally is formed with a reduced amount, e.g., 0% by weight, of VOCs. Suitable surfactants and optional solvents are also used. Other ingredients known to furniture polish formulators such as propellants, fragrance, buffers, colors, and preservatives may be added as desired or needed.

Our invention may be further described by reference to the following exemplary embodiment.

The embodiment is an oil-in-water formulation which may be either a liquid or an aerosol composition. This formulation comprises an oil-in-water surfactant(s), a silicone component formed of one or both of a low-viscosity silicone fluid and a polydiorganosiloxane, a phosphonic acid dispersant, optionally an amount of a hydrocarbon solvent, a propellant (if desired) and water.

In the embodiment described above, fragrance, color, thickener, buffers, preservatives/biocides, resins or other conventional ingredients known in the furniture polish art can be added as desired.

MODES FOR CARRYING OUT THE INVENTION

While we have described one embodiment of our disclosure, it is not limited to this example, as one of ordinary skill in the art can readily develop other suitable formulations. The present disclosure should therefore be considered to exemplify the invention, and not as a limitation to the specifically described embodiment.

Our disclosure is a furniture polish composition comprising in certain embodiments a silicone component formed of a silicone component formed of one or both of a low viscosity silicone fluid and a polydiorganosiloxane, a phosphonic acid dispersant, an oil-in-water surfactant, and water. In certain embodiments it is also contemplated that the polish composition can comprise a silicone component formed of one or both of a low viscosity silicone fluid and a polydiorganosiloxane, a phosphonic acid dispersant, and water.

Low-Viscosity Silicone Fluids

The low viscosity silicone fluids useful in the present disclosure have viscosities of about 5 to about 5,000 centistokes, preferably about 50 to 200 centistokes. Suitable silicones may be used either "neat" ("stripped") or "unstripped". Unstripped silicones contain lower viscosity, lower molecular weight volatile fractions in addition to the primary siloxane. A stripped silicone contains essentially no lower viscosity, volatile fraction. Either a stripped or unstripped composition can be used in the present disclosure.

Unstripped silicones have the added advantage of being less costly than stripped silicones. They also enhance the performance of the furniture polish by making it easier to wipe and by providing a drier film. Nonetheless, stripped silicones with the appropriate viscosity can be used to provide a furniture polish with good performance.

Silicones useful in the present disclosure can be substituted with any organo-group known in the silicone art, provided the silicones are not toxic. In addition to utility, economic considerations play a part in formulation. For example, while a phenylmethyl silicone is within the scope of this disclosure, its cost makes it unlikely to be used on a commercial scale.

Suitable, unstripped silicone fluids include polydimethylsiloxanes and can be purchased, for example, from Wacker Silicones Corporation. Particularly suitable is Silicone Fluid WACKER® AK 100 SILICONE FLUID (100 centistokes, unstripped).

Phosphonic Acid Dispersant

The phosphonic acid dispersants used in the composition of the present disclosure function as a hydrotrope which are effective to help solubilize the hydrophobic components of the composition, including, but not limited to parts of the fragrance, into the larger water phase, in addition to assisting in dispersing these and other components throughout the phases. Further, the phosphonic acid component acts as a corrosion inhibitor.

Suitable phosphonic acid dispersant components include an octane phosphonic acid, such as n-octyl phosphonic acid, and can be purchased, for example, from Clariant Corp. under the tradenames HOSTAPHAT® OPS 30, 75 or 100.

In addition various co-dispersants can be utilized with the phosphonic acid dispersant. These can include multifunctional amines, such as AMP-95 from Dow Chemical Co., that can also function as a buffer for the polish composition Polydiorganosiloxane The silicone component of the furniture polish of the present disclosure can also include, or be formed of a polydiorganosiloxane, which may be terminated with groups such as hydroxyl, methyl, alkoxy and vinyl groups.

As with the low viscosity silicone fluid, the organo-group in the polydiorganosiloxane can be any organo-group known in the silicone art, provided the polydiorganosiloxane is not toxic.

Again, economic considerations play a role in selecting appropriate compounds.

Viscosities of about 1,000 to about 20,000 centistokes or more are suitable, with viscosities of about 2,000-6,000 centistokes preferred.

The hydroxyl terminated polydimethylsiloxane is preferred and may also be purchased from Wacker Silicones Corporation under the name ELASTOMER 6N.

Unlike other furniture polish compositions, furniture polishes according to the present disclosure do not require a wax to anchor the silicone because all the film forming materials are compatible with and soluble in each other. It is believed this compatibility results in improved film clarity and better ease of use because there are no discrete wax particles out of solution.

Manufacturing costs are reduced because, unlike conventional wax-containing furniture polishes, minimal heat is required to blend the components.

As noted previously, furniture polish compositions in accordance with this disclosure may also include any or all of the following: oil-in-water and water-in-oil surfactants, water, and other optional ingredients, such as hydrocarbon solvents, preservatives, buffers, emulsifiers, colors, resins and fragrance.

Surfactants

The polish compositions of the following embodiments are oil-in-water (i.e. so-called "water out") emulsions.

Those skilled in the art can readily choose an appropriate surfactant (or emulsifier) or combination of surfactants (or emulsifiers), to produce the desired type of emulsion, if necessary.

As those skilled in the art can well appreciate, the term "emulsion" is generally recognized as connoting a stable mixture of two or more mutually immiscible liquids held in suspension by small percentages of substances called emulsifiers (or surfactants). All emulsions, moreover, are characterized as comprising a continuous phase and a discontinuous phase which is dispersed throughout the continuous phase.

Still more particularly, in the formulation of the various emulsion polish compositions of the present disclosure, the various solvents and optional surfactants described below are typically those conventionally used in furniture polish compositions.

Accordingly, surfactants (or emulsifiers) useful for purposes of the present disclosure include conventional non-ionic, cationic, and anionic surfactants (or emulsifiers) commonly employed in commercial polishes for applications to furniture surfaces. Such conventional surfactants can be used alone or in combination.

Thus, in certain embodiments, certain conventional non-ionic surfactants, as well as certain combinations of conventional non-ionic surfactants, are optionally utilized because they provide certain desirable emulsion-stability properties. Conventional optional non-ionic surfactants for emulsifiers, suitable for purposes of these embodiments, accordingly include, but are not limited to, the so-called "sorbitan" esters of oleic and lauric acids, those polyethoxylated sorbitan esters having up to 20 ethoxy units: the monoglycerides and diglycerides of the fat-forming fatty acids, and combinations thereof.

Additional examples of optionally preferred, commercially-available non-ionic surfactants (or emulsifiers) include certain "Span" brand and "Tween" brand emulsifiers, both presently available from ICI Americas, Inc.; and the "Monamid" brand emulsifiers, presently available from Mona Industries, Inc. Particular examples of such emulsifiers include sorbitan monooleate, sold by ICI Americas, Inc. under the SPAN® 80 brand: and polyethoxylated sorbitan monooleate, sold by ICI Americans, Inc. under the TWEEN® 80 brand. Mixtures of the various above-mentioned optional surfactants (or emulsifiers) can also be utilized, if desired, in accordance with the principles of these embodiments.

It is, accordingly, further presently believed that the following conventional cationic surfactants or emulsifiers would be suitable for purposes of these embodiments. These include certain quaternary ammonium compounds such as the quaternary ammonium halides, the quaternary ammonium sulfates, those so-called "fatty" amines which are ethoxylated and have about 2 to about 10 moles of ethylene oxide, and the chloride salts or acetate salts of such amines, as well as those amines which are ethoxylated and have 2 or more moles of ethylene oxide. Various mixtures or combinations of the above-noted optional surfactants (or emulsifiers) can also be utilized by those skilled in the art, in accordance with the principles of the present disclosure, if desired.

Conventional optional anionic surfactants or emulsifiers, suitable for purposes of this disclosure, include certain sulfates (such as sodium lauryl sulfate, and the sodium alkyl ether sulfates), those sulfosuccinates containing polyethylene glycol moieties attached thereto, as well as the alkyl aryl sulfonates. Mixtures of the above optional surfactants (or emulsifiers) can also be utilized, in accordance with the principles of these embodiments if desired.

Other anionic emulsifiers that are suitable in these and other embodiments of this disclosure are anionic associative polymers. Anionic associative polymers may be chosen from copolymers derived from (i) at least one monomer comprising at least one ester derived from a carboxylic acid and a polyethylene glycol ether and (ii) at least one monomer comprising at least one carboxylic acid group. The at least one monomer comprising at least one carboxylic acid group, in one embodiment, may be chosen from acrylic acid and methacrylic acid. The anionic associative polymer may further comprise at least one unit comprising at least one ester chosen from esters derived from acrylic acid and a polyethylene glycol ether and esters derived from methacrylic acid and a polyethylene glycol ether. The polyethylene glycol ether, for example, may be chosen from polyethylene glycol ethers of at least one alcohol chosen from stearyl alcohol, lauryl alcohol, nondecanol, arachidyl alcohol, heneicosanol, behenyl alcohol, tricosanol, triacontanol, and hentriacontanol.

Anionic associative polymers useful in these and other embodiments of this disclosure may include, but are not limited to, acrylic polymers, such as polyacrylates and polymethacrylates, and acrylic copolymers and crosspolymers, and sodium polyacrylate sold under tradename RAPITHIX® A-100 from International Specialty Products; alkali-soluble/swellable emulsion (ASE) polymers, hydrophobically-modified alkali-soluble emulsion (HASE) polymers, and hydrophobically-modified ethoxylated urethane (HEUR) polymers, such as those sold under tradename ACULYN™ from Rohm and Haas Company and STRUCTURE® from National Starch and Chemical Company; hydrophobically-modified ethoxylate urethane alkali-soluble/swellable emulsion (HUERASE) polymers, such a those sold under tradename UCAR® POLYPHOBE® from Union Carbide Corporation; copolymers of methyl vinyl ether and maleic anhydride, such as PVM/MA decadiene crosspolymer sold under tradename STABILEEZE® from International Specialty Products; hydrophobically modified non-ionic associative thickeners such as those sold under tradename PURE-THIX® from Sud-Chemie; and mixtures thereof.

In one embodiment, the composition of the present disclosure includes acrylates/C10-C30 alkyl acrylate crosspolymers as an emulsifier, such as PEMULEN™ TR-1 from Lubrizol. PEMULEN™ polymers are described by the manufacturer as high molecular weight, crosslinked copolymers of acrylic acid and C10-C30 alkyl acrylate that are primarily used to form stable oil-in-water emulsions and contain both hydrophobic and hydrophilic portions within the molecule. The hydrophobic portion of the polymer adsorbs at the oil phase and the hydrophilic portion swells in the water forming a gel network around the oil droplets to provide exceptional emulsion stability. PEMULEN™ polymers form stable oil-in-water emulsions with no or low levels of co-surfactant which, if present, enhances end product stability. PEMULEN™ polymers provide efficient suspension and stabilization of insoluble materials and particles and provide shear thinning rheology which enables easy pumping and spraying of finished end compositions.

Optional Ingredients

Those skilled in the art know that solvents are typically utilized in conventional polish compositions for purposes of removing solvent-soluble residues from substrate surfaces. For optimum results, therefore, any optional solvents that are utilized in preparing the emulsion polish compositions of these and other embodiments of this disclosure should be sufficiently volatile so as to bring about rapid drying after the composition has been applied to a substrate surface, and yet, not so volatile as to prematurely dry up before desired spreading of the composition onto the substrate surface (for purposes of providing a desired film) has taken place.

Accordingly, certain optional solvents deemed particularly useful, in accordance with the principles of these and other embodiments of this disclosure, have so-called "kauributanol" values of from about 20 to about 50, and have boiling-point ranges of from about 60 degrees Celsius ("C.") to about 210° C. and preferably from about 95° C. to about 150° C.

A wide variety of commercially-available isoparaffinic hydrocarbon solvents, such as those commercially available from the Exxon Corporation under the "Isopar" brand as well as the isoparaffinic-type hydrocarbon solvents commercially available from the Phillips Petroleum Corporation under the "Soltrol" brand, are moreover presently preferred because they are substantially odor-free.

Other suitable hydrocarbon solvents, in accordance with the principles of these and other embodiments of this disclosure, include pentane, hexane, heptane and the so-called "Stoddard" solvents.

The various above-described hydrocarbon solvents, furthermore, can be utilized individually or in combination.

However, in order to reduce or avoid the detrimental effects of volatile solvents that are VOCs, the polish compositions can employ reduced amounts of these types of solvents as compared with prior art polish compositions. When the VOC solvents are present in the polish composition, they are present in amounts sufficient to maintain the benefits provided by these types of solvents, but not exceeding those amounts. Further, in other embodiments, the polish composition can be free of the volatile solvents classified as VOCs, meaning that polish composition has no VOC component in the composition.

Additionally, as was implied above, certain embodiments of the emulsion polish compositions are totally wax-free. However, it may be desirable, in certain situations, to utilize a relatively minor amount of wax in specific formulations. Thus, from about 0.05 to about 2.0 weight-percent wax, preferably from about 0.05 to about 0.5 weight percent wax based upon total weight of the emulsion polish composition, may optionally be employed in the furniture polish compositions of these embodiments. Conventional waxes, suitable for purposes of these embodiments, accordingly include, but are not limited to, certain synthetic waxes such as the microcrystalline waxes and the petroleum waxes as well as certain natural waxes such as the so-called "candellila" and "carnauba" waxes.

Still other well-known additives, including but not limited to corrosion inhibitors, pH buffers perfumes, colorants and preservatives/biocides may optionally be added to the emulsion polish compositions of these and other embodiments of this disclosure.

Perfumes are typically added, for example, to import a desired fragrance. Conventional perfumes, suitable for purposes of these embodiments, are well known to those skilled in the art and accordingly need not be described in detail here. The amount of perfume which is included is typically present in an amount that is effective for imparting a desired fragrance intensity. Such an amount of perfume can range, for example, from about 0.05% to about 1% by weight of the emulsion polish composition (exclusive of any propellant, if present).

Preservatives or biocides are generally utilized to retard and otherwise thwart bacterial activity within packages containing certain formulations of the emulsion polish compositions of these and other embodiments of this disclosure. As those skilled in the art can appreciate, the presence of such preservatives and biocides is for prolonging the shelf life of the emulsion polish composition. A variety of well-known conventional quaternary compounds and formaldehyde-free compositions, among others, can moreover be utilized for such a purpose.

Various pH buffers can also be employed to provide the composition with a desired pH level in these and other embodiments of this disclosure. Inorganic alkali bases such as sodium hydroxide, potassium hydroxide or ammonium hydroxide are effective neutralizing agents. In addition, organic amine bases such as triethanolamine, tromethamine, and tetrahydroxypropyl ethylenediamine and other multi-functional amines are particularly suitable due to their relative mildness.

Furthermore, the emulsion polish compositions of these and other embodiments of this disclosure can be applied directly onto a substrate surface, utilizing e.g. a wide variety of well-known conventional pressurized systems containing an appropriate amount of a liquid or gaseous propellant. In particular, the emulsion polish compositions can be applied directly onto a substrate surface, utilizing well-known spray means such as conventional pump sprayers.

Additionally, the emulsion polish compositions can be applied to furniture surfaces, utilizing a polishing cloth, or other suitable means. Still further, the furniture polish compositions can be incorporated into articles of manufacture—such as absorbent cloths—if desired. See, e.g. U.S. Pat. No. 3,965,518 to Muoio.

Moreover, as was briefly implied above, the emulsion polish composition of these and other embodiments of this disclosure can be provided in aerosol form. To produce such an aerosol form, the emulsion polish composition is typically introduced into a conventional aerosol container which is then capped with an aerosol valve. Thereafter, an effective amount of a suitable, conventional propellant is introduced into the aerosol container, in a known manner, for achieving a desired pressure in the container. Such propellant pressure should therefore be sufficient for enabling substantially complete expulsion of the contents of the aerosol container in the form of a spray in the desired manner, through the aerosol valve. Any of a wide variety of suitable conventional propellants which may be used include such well-known liquified hydrocarbons propellant gases as isobutane, n-butane and propane, and various mixtures of these. Additional illustrative propellants include, for example, compressed air, carbon dioxide and/or nitrogen.

Moreover, the precise method of manufacturing the polish compositions of these and other embodiments of this disclosure is not critical. The order and/or manner of addition of the various emulsion polish composition ingredients, mentioned above, may accordingly generally be varied and typically will not affect the quality of a particular emulsion polish composition which is thus being formulated or produced. Conventional techniques for forming water-in-oil and oil-in-water emulsion polishes are typically used to produce the various embodiments of the emulsion polish compositions of these embodiments. However, due to the components of the polish composition of this disclosure, various embodiments of the polish composition can be formed with the addition of little or no heat to the composition, e.g., at room temperature.

These and other embodiments of this disclosure will now be described in more detail with reference to specific examples of each embodiment.

The examples of these and other embodiments of this disclosure use the following ingredients:

Isopar E® which is an isoparaffinic hydrocarbon solvent available from the Exxon Corp.

Span® 80, sorbitan monooleate, and Tween® 80, polyoxyethylene sorbitan monooleate, both available from ICI Americas, Inc.

Neolone™ M-10, a formaldehyde-free biocide available from Dow Chemical Corp.

Pemulen™ TR-1, a C10-C30 alkyl acrylate crosspolymer available from Lubrizol Corp.

WACKER® AK 100 SILICONE FLUID is an 100 Cstk silicone fluid available from Wacker Silicones Corp.

HOSTAPHAT® OPS 30 is an octane phosphonic acid solution available from Clariant Corp.

Elastomer 6N is a polydimethylsiloxanediol with a viscosity of 6,000 centistokes available from Wacker Silicones Corp.

AMP-95 is a multifunctional amine available from Dow Chemical Co.

Of course, these ingredients are merely exemplary of the kinds of ingredients which are suitable for use in these and other embodiments of this disclosure, and are not intended to limit the scope of the invention disclosed herein. Substitution or addition of other suitable materials is within the scope of this disclosure.

Oil-in-Water Furniture Polish

In one embodiment, an oil-in-water furniture polish composition can be prepared using an oil-in-water surfactant(s), a low viscosity silicone fluid and/or a polydiorganosiloxane, a phosphonic acid dispersant, and water, optionally with a hydrocarbon solvent among other optional ingredients such as fragrance, colorant(s), preservatives/biocides and additional emulsifiers, for example. This composition is in the form of a liquid.

More particularly, in certain embodiments the oil-in-water furniture polish contains about 0.05% to 5.00% w/w, and more particularly about 0.50-2.00% w/w of an oil-in-water surfactant(s); about 0.01-1.00% w/w, and more particularly about 0.10-0.30% w/w or about 0.70-0.90% w/w of a phosphonic acid dispersant; one or both of about 0.3-50.0% w/w, and more particularly about 5.0-12.0% w/w of an unstripped low viscosity silicone fluid and about 0.1-5.0% w/w, and more particularly about 0.3-1.30% w/w of a polydiorganosiloxane; about 0-25% w/w, and more particularly about 0.0-11.0% w/w of a hydrocarbon solvent, with the balance being water. Optionally, the polish composition can also include about 0.05-0.50% w/w and more particularly about 0.10-0.30% w/w of a polymeric emulsifier, about 0.05-0.30% w/w and more particularly about 0.10-0.20% w/w of a biocide and/or preservative, about 0.20-0.70% w/w and more particularly 0.25-0.50% w/w of a buffer material and about 0.10-0.90% w/w, and more particularly 0.30-0.50% w/w/ or 0.70-0.85% w/w of a fragrance.

The above liquid furniture polish composition can also be made in aerosol form by the addition of about 5.0-25.0% w/w, and more particularly about 8.0-11.0% w/w of a propellant to the liquid composition described above. In the event a hydrocarbon propellant is used, the amount of hydrocarbon solvent in the liquid composition can be adjusted downward, as recognized by those skilled in the art. Other suitable propellants include hydrocarbon propellants, compressed gases, e.g., air, carbon dioxide and nitrogen, among others, dimethyl ether and non-ozone depleting hydrofluorocarbons.

Different embodiments of an oil-in-water furniture polish in accordance with the present disclosure is found in the following four examples:

EXAMPLE 1

| Material | Weight Percentage |
|---|---|
| Silicone Fluid, 100 cstks | 6.50% |
| SPAN ® 80 | 0.50% |
| ELASTOMER 6N | 0.50% |
| Fragrance | 0.40% |
| TWEEN ® 80 | 0.70% |
| HOSTAPHAT ® OPS 30 | 0.25% |
| NEOLONE ™ M-10 | 0.15% |
| PEMULEN ™ TR-1 | 0.20% |
| AMP-95 | 0.30% |
| Deionized Water | 90.5% |

The above ingredients were formulated into a liquid furniture polish in the following manner:

1. Mix silicone fluid 100cstk, Span® 80 and Elastomer 6N in one tank (called "oil phase") at room temperature and pressure.
2. In another tank, combine part of water, Hostaphat® OPS 30, Neolone M-10, Tween® 80 and fragrance (called "water phase") at room temperature and pressure.
3. Add "oil phase" to "water phase" and form an oil-in-water emulsion with continuous agitation during this step.
4. Shear the emulsion via a homogenizer (very high shear) at 1,000-2,000 psi.
5. In-line blend Pemulen TR-1 in the remainder of water at room temperature and pressure and add this mixture to the sheared emulsion.
6. Neutralize Pemulen TR-1 with AMP-95 and build viscosity. Pemulen TR-1 is a slightly acidic polymer and works best (i.e. has stable viscosity) at neutral pH range of about 4 to about 8.

The resulting furniture polish provided a very high gloss level, low smear levels and was very easy to use.

EXAMPLE 2

| Material | Weight Percentage |
|---|---|
| ISOPAR E ® | 10.00% |
| Silicone Fluid, 100 cstks | 6.50% |
| SPAN ® 80 | 0.50% |
| ELASTOMER 6N | 0.50% |
| Fragrance | 0.40% |
| TWEEN ® 80 | 0.70% |
| HOSTAPHAT ® OPS 30 | 0.25% |
| NEOLONE ™ M-10 | 0.15% |
| PEMULEN ™ TR-1 | 0.20% |
| AMP-95 | 0.30% |
| Deionized Water | 80.5% |

A furniture polish composition containing the above ingredients was formulated by the following procedure:

1. Mix Isopar E®, silicone fluid 100cstk, Span® 80 and Elastomer 6N in one tank (called "oil phase") at room temperature and pressure.
2. In another tank, combine part of water, Hostaphat® OPS 30, Neolone M-10, Tween® 80 and fragrance (called "water phase") at room temperature and pressure.
3. Add "oil phase" to "water phase" and form an oil-in-water emulsion with continuous mixing to prevent separation of the emulsion phases.
4. Shear the emulsion via a homogenizer (very high shear) at 1,000-2,000 psi.
5. In-line blend Pemulen TR-1 in the remainder of the water (at room temperature and pressure and add this mixture to the sheared emulsion.
6. Neutralize Pemulen TR-1 with AMP-95 (e.g. to pH from 4-8) and build viscosity as in Example 1.

The resulting furniture polish provided good gloss and a very low smear rate.

EXAMPLE 3

| Material | Weight Percentage |
| --- | --- |
| ISOPAR E ® | 10.00% |
| Silicone Fluid, 100 cstks | 6.50% |
| SPAN ® 80 | 0.50% |
| ELASTOMER 6N | 0.50% |
| Fragrance | 0.40% |
| TWEEN ® 80 | 0.70% |
| HOSTAPHAT ® OPS 30 | 0.83% |
| NEOLONE ™ M-10 | 0.15% |
| PEMULEN ™ TR-1 | 0.20% |
| AMP-95 | 0.35% |
| Deionized Water | 79.87% |

The composition of Example 3 is formed in a process similar to that of Examples 1 and 2 and is formed to have a viscosity of about 1500 cps and a final pH in the range of 7.5 to 8.5.

EXAMPLE 4

| Material | Weight Percentage |
| --- | --- |
| ISOPAR E ® | 10.00% |
| Silicone Fluid, 100 cstks | 6.50% |
| SPAN ® 80 | 0.50% |
| ELASTOMER 6N | 0.50% |
| Fragrance | 0.80% |
| TWEEN ® 80 | 0.70% |
| HOSTAPHAT ® OPS 30 | 0.83% |
| NEOLONE ™ M-10 | 0.15% |
| PEMULEN ™ TR-1 | 0.20% |
| AMP-95 | 0.35% |
| Deionized Water | 79.47% |

The composition of Example 4 is formed in a process similar to that of Examples 1 and 2 and is formed to have a viscosity of about 1500 cps and a final pH in the range of 7.5 to 8.5.

Lotion Furniture Polish

A second embodiment of the present disclosure is a lotion formulation which may be made in the form of an aerosol. Such formulation typically contains about 0.1-5.0% w/w, and more particularly about 0.5-2.0% w/w water-in-oil surfactants; a silicone component formed of about 5.0-25.0% w/w, and more particularly about 7.0-15.0% w/w of a low viscosity silicone fluid; about 0.0-25.0% w/w, and more particularly about 0.0-11.0% w/w of a hydrocarbon solvent; 5.0-25.0% w/w, and more particularly about 8.0-11.0% w/w of a propellant (if desired), and water to make up the balance. Further, as is well known in the art, small amounts of oil-in-water surfactants, e.g. about 0.1-5.0% w/w, and more particularly about 0.5-2.0% w/w, may be optionally added to aid emulsion stability. Fragrance, buffers, color, other silicone components, such as a polydiorganosiloxane, and preservatives/biocides can also be added as desired.

If it is desired to dispense the compositions of Examples 1, 2, 3 and 4 or the lotion composition as an aerosol, suitable propellants to be used in the amounts specified above include hydrocarbon propellants, compressed gases, such as air and nitrogen, among others, dimethyl ether and non-ozone depleting hydrofluorocarbons.

One embodiment of an aerosol package for this product would be a bi-compartmentalized aerosol container where the propellant is separated from the intermediate, but is not limited to this type of aerosol delivery system. Examples of suitable packages include Sepro, C.M.B. bi-can, or piston-type units.

The lotion formula can also be packaged as a non-aerosol product without the propellant, and delivered from a bottle, tube or pouch.

INDUSTRIAL APPLICABILITY

The above compositions are described for purposes of illustration only and any type of formulation known in the art can be made using this technology including creams, lotions, liquids, and aerosols. Delivery systems are also those known in the art and include bottles, pouches, cans, trigger or pump sprays, aerosol cans, and impregnated porous substrates.

The invention claimed is:

1. A furniture polish comprising: 1) a silicone component; 2) a phosphonic acid dispersant; 3) a non-ionic, cationic or anionic surfactant that is different than the silicone component and is selected from the group consisting of: a sorbitan ester of oleic acid or lauric acid, a polyethoxylated sorbitan ester having up to 20 ethoxy units, a monoglyceride or diglycerides of fat-forming fatty acids, quaternary ammonium halides, a quaternary ammonium sulfate, a fatty amine which is ethoxylated and has about 2 to about 10 moles of ethylene oxide, a chloride salt or acetate salt of the fatty amine, a fatty amine which is ethoxylated and has 2 or more moles of ethylene oxide, a sodium lauryl sulfate, a sodium alkyl ether sulfate, a sulfosuccinates containing polyethylene glycol moieties attached thereto, an alkyl aryl sulfonates and combinations thereof; 4) water and 5) an anionic associative polymer, wherein the polish is free of volatile organic components and wax and has a pH of between about 4 and about 8.5 and wherein the polish comprises 1.2% to 5.00% of the oil-in-water non-ionic, cationic or anionic surfactant.

2. The furniture polish of claim 1 wherein the silicone component comprises: 1) a silicone fluid with a viscosity of about 50-200 centistokes and 2) a polydimethylsiloxanediol with a viscosity of about 2,000-6,000 centistokes.

3. An oil-in water furniture polish comprising about 1.2% to 5.00% of an oil-in-water non-ionic, cationic or anionic surfactant that is selected from the group consisting of: a sorbitan ester of oleic acid or lauric acid, a polyethoxylated sorbitan ester having up to 20 ethoxy units, a monoglyceride or diglycerides of fat-forming fatty acids, quaternary ammonium halides, a quaternary ammonium sulfate, a fatty amine which is ethoxylated and has about 2 to about 10 moles of ethylene oxide, a chloride salt or acetate salt of the fatty amine, a fatty amine which is ethoxylated and has 2 or more moles of ethylene oxide, a sodium lauryl sulfate, a sodium alkyl ether sulfate, a sulfosuccinates containing polyethylene glycol moieties attached thereto, an alkyl aryl sulfonates and combinations thereof; about 03-50.0% of a low viscosity silicone fluid; about 0.2-5.0% of a polydiorganosiloxane; about 0-25% of a hydrocarbon solvent; about 0.01-1.00% of a phosphonic acid dispersant, about 0.005% to 0.50% w/w of an anionic associative polymer and the balance being water, wherein the polish is free of wax and has a pH of between about 4 and about 8.5.

4. The furniture polish of claim 3 including a propellant for aerosol delivery of the polish.

5. The furniture polish according to claim 3 where the low viscosity silicone has a viscosity of about 50-200 centistokes.

6. The furniture polish according to claim 3 where hydrocarbon solvent is present in an amount of about 10.0% to 11.0%.

7. The furniture polish according to claim 3 where the phosphonic acid dispersant is n-octyl phosphonic acid.

8. The furniture polish according to claim 3 where the anionic associative polymer is high molecular weight, cross-linked copolymers of acrylic acid and C10-C30 alkyl acrylate.

* * * * *